(12) United States Patent
Kim

(10) Patent No.: US 11,602,200 B2
(45) Date of Patent: Mar. 14, 2023

(54) APPARATUS FOR TIGHTENING STRING

(71) Applicant: Sug Whan Kim, Gimpo-si (KR)

(72) Inventor: Sug Whan Kim, Gimpo-si (KR)

(*) Notice: Subject to any disclaimer, the term of this patent is extended or adjusted under 35 U.S.C. 154(b) by 486 days.

(21) Appl. No.: 16/645,050

(22) PCT Filed: Jul. 2, 2018

(86) PCT No.: PCT/KR2018/007468
§ 371 (c)(1),
(2) Date: May 12, 2020

(87) PCT Pub. No.: WO2019/054609
PCT Pub. Date: Mar. 21, 2019

(65) Prior Publication Data
US 2021/0030119 A1 Feb. 4, 2021

(30) Foreign Application Priority Data

Sep. 14, 2017 (KR) .......................... 10-2017-0117987
Jun. 29, 2018 (KR) .......................... 10-2018-0075645

(51) Int. Cl.
| | | |
|---|---|---|
| A43C 11/16 | (2006.01) |
| F16G 11/00 | (2006.01) |
| B65H 75/40 | (2006.01) |
| F16G 11/12 | (2006.01) |
| F16G 11/14 | (2006.01) |
| B65H 63/08 | (2006.01) |
| F16G 11/10 | (2006.01) |

(52) U.S. Cl.
CPC ............ *A43C 11/165* (2013.01); *F16G 11/00* (2013.01); *B65H 63/086* (2013.01); *B65H 75/40* (2013.01);
(Continued)

(58) Field of Classification Search
CPC ....... A43C 11/165; A43C 7/08; A43C 11/008; A43C 11/14; F16G 11/00; F16G 11/106;
(Continued)

(56) References Cited

U.S. PATENT DOCUMENTS 9,629,417 B2 * 4/2017 Cavanagh ............ A43C 11/165
10,512,305 B2 * 12/2019 Omarsson ................ A61F 5/01
(Continued)

FOREIGN PATENT DOCUMENTS

JP 2016-520401 7/2016
KR 20-2010-0009337 9/2010
(Continued)

*Primary Examiner* — David M Upchurch
(74) *Attorney, Agent, or Firm* — Lex IP Meister, PLLC

(57) ABSTRACT

The present invention discloses a string tightening device that can easily adjust the characteristics of the string, such as the length or tension of the string used in various wearing products or household items, including shoes, bags, clothing, and the like.

A string tightening device of the present invention includes: a base having a space therein and including a first projection portion; a lower rotation member that is disposed in the base and moves a predetermined distance in a direction of separation from the base or the opposite direction thereof, an upper rotation member coupled to the lower rotation member, including a second locking portion corresponding to the first locking portion, and rotating only in one direction when the first locking portion and the second locking portion are closely attached; and an inner housing portion provided in the lower rotation member or the upper rotation member and wound therearound.

23 Claims, 28 Drawing Sheets

(52) U.S. Cl.
CPC ............ *F16G 11/106* (2013.01); *F16G 11/12* (2013.01); *F16G 11/14* (2013.01); *Y10T 24/3724* (2015.01)

(58) Field of Classification Search
CPC ....... F16G 11/12; F16G 11/14; B65H 63/086; B65H 75/40; Y10T 24/3724
See application file for complete search history.

(56) References Cited

U.S. PATENT DOCUMENTS

| | | | |
|---|---|---|---|
| 2005/0081339 A1 | 4/2005 | Sakabayashi | |
| 2008/0060167 A1* | 3/2008 | Hammerslag | A43C 11/165 24/714.6 |
| 2010/0139057 A1* | 6/2010 | Soderberg | A61F 5/0118 242/396.2 |
| 2011/0167543 A1* | 7/2011 | Kovacevich | F16G 11/12 2/417 |
| 2016/0198801 A1* | 7/2016 | Kim | A43C 11/165 24/68 C |

FOREIGN PATENT DOCUMENTS

| | | |
|---|---|---|
| KR | 10-0986674 | 10/2010 |
| KR | 10-1025134 | 3/2011 |
| KR | 10-1707484 | 2/2017 |
| WO | 2014-197721 | 2/2015 |
| WO | 2018155732 | 8/2018 |

* cited by examiner

APPARATUS FOR TIGHTENING STRING

TECHNICAL FIELD

The present invention relates to a string tightening device that can adjust physical characteristics of a string, including the length or tension of a string used in a variety of wearing products, such as shoes, bags, clothing, etc., or household items.

BACKGROUND ART

In general, various types of wearable products including shoes, bags, backpacks, and clothes are provided with fastening and loosening means using a string or wire, or a band similar to a string. For example, a user can put laces in the shoe in a zigzag shape and pull the ends of the laces to tighten the shoelaces.

However, such a conventional method of tightening the shoelaces applied to the shoes has a very cumbersome problem that the user unwinds or tightens the laces whenever the user wears and removes the shoes.

To solve this problem, tightening devices for winding the string are used. The conventional string tightening device is not easy to assemble during manufacturing, which increases the assemble time and manufacturing cost, and there is a problem in that maintenance by the user is difficult when breakdown occurs due to difficulty in disassembly during maintenance.

In addition, conventional devices tightening a string have a problem that it is not easy to apply to underwear or small bags due to its large size, as it cannot be compactly manufactured.

DISCLOSURE

Technical Problem

The present invention has been made in an effort to solve the above-stated problems, and provides a string tightening device that enables a user to easily tighten or loosen a string applied to a wearable product such as shoes, bags, and clothes.

In addition, another object of the invention is to provide a string tightening device that minimizes the number of parts and optimizes the position of the drive to improve assemble and productivity.

In addition, another object of the present invention is to provide a string tightening device that is easy to assemble and disassemble to minimize an assembly process and to easily replace parts, so that maintenance can be directly carried out by the user.

In addition, another object of the present invention is to provide a string tightening device that can be applied to a variety of products by easily maximizing the tension of the string and thus being easily applied to shoes requiring high tension.

In addition, another object of the present invention is to provide a string tightening device that is compactly manufactured by reducing size or volume and is easily applied to wearable products such as shoes, bags, and clothes, and is applicable to various products.

In addition, another object of the present invention is to provide a string tightening device capable of simultaneously winding and tightening one or more strings to increase the application range.

Technical Solution

In order to achieve the above-stated object of the present invention, the present invention provides a string tightening device including: a base where a first locking portion is provided; a lower rotation member that is disposed in the base and moves a predetermined distance in a direction of separation from the base or the opposite direction thereof; and an upper rotation member coupled to the lower rotation member, including a second locking portion corresponding to the first locking portion, and rotating only in one direction when the first locking portion and the second locking portion are closely attached, the lower rotation member or the upper rotation member is provided with an inner housing portion where the string is wound.

the base is provided with a first projection portion that is concave along an internal circumferential direction of a lower end portion thereof, and a portion of the lower rotation member is caught by the first projection portion and thus movement is limited to a certain distance or less along a direction parallel to a rotation axis of the lower rotation member.

The base and the upper rotation member preferably include a rotation unit position adjusting portion that is provided in portions facing each other and maintaining the first locking portion and the second locking portion in a closely attached state or in a separated state.

The rotation unit position adjusting portion may be formed of a first protrusion portion provided in the base and a second protrusion portion provided in the upper rotation member, while being adjacent to the first protrusion portion.

The first protrusion portion is preferably formed in an outer direction along an external circumferential surface of the base, and the second protrusion portion is preferably formed along an internal circumferential surface of the upper rotation member, facing the external circumferential surface of the base when the upper rotation member is disposed while surrounding a part of the external circumferential surface of the base.

The first locking portion is preferably formed of an elastic latch or a plurality of protection portions, and the second locking portion is preferably formed of another projection portion or elastic latch caught by the elastic latch or the plurality of projection portions of the first locking portion.

The elastic latch is formed of an elastic body and of which one end is a free end, and, the projection portion is preferably formed in the shape of gear teeth arranged at a regular interval along the circumferential direction.

The elastic latch extend from one end of the base and an elastic force may be applied in a direction facing one side of the upper rotation member, and the projection portion may be formed in a side of the upper rotation member, facing the elastic member, and may form an inclined surface such that the upper rotation member rotates only in one direction when the free end portion of the elastic latch is closely attached.

The base may include: an outer housing portion formed in the shape of a cylinder; and a coupling extension portion extending in a radial direction from the outer housing portion.

The coupling extension portion may be formed of a synthetic resin and may be coupled to footwear by sewing or an adhesive.

The outer housing portion may include a first string penetration hole portions through which the string passes while penetrating a wall surface.

The outer housing portion may include a string guide portion provided at the periphery of the first string penetration hole portion and prevents the string from interfering with the upper rotation member.

The lower rotation member may include: a plate portion; and an inner housing portion provided in the shape of a cylinder in the plate portion.

The inner housing portion may include a second string penetration hole portion in which a groove is provided at a wall surface thereof such that the string passes therethrough.

The lower rotation member include a plurality of first fitting coupling portions, and the upper rotation member may include second fitting coupling portions coupled to the first fitting coupling portions.

The base may include a first projection portion of which an internal circumferential surface of one end is concave along a circumferential direction, and the lower rotation member may include a second projection portion that is provided in an external circumferential surface along the circumferential direction corresponding to the first projection portion.

The upper rotation member may be integrally formed with the string engaging portion.

When a portion of the string engaging portion, coupled to the upper rotation member, is a fixed end and the opposite side thereof is a free end, the string engaging portion may be formed in the shape of a taper of which a diameter of the free end is decreased, and may include at least one or more of third string penetration hole portions through which a string is penetrated.

The lower rotation member may be integrally formed with the inner housing portion.

The upper rotation member may include a string engaging portion coupled by an engaging member.

The coupling extension portion may include a fourth string penetration hole portion formed in the shape of a divided groove in a portion thereof.

The coupling extension portion may extend from a middle portion of an external circumferential surface of the outer housing portion while maintaining a constant distance from the bottom surface with reference to the entire height of the outer housing portion.

Advantageous Effects

According to the present invention, when a string tightening device is applied to wearable products such as shoes, bags, and clothes, a user can easily tighten or loosen a string by simply pressing and rotating the upper rotation member.

In addition, the invention has an effect of improving assembling quality and productivity by minimizing the number of parts while easing disassembly and assembly.

In addition, according to the present invention, the user can separate a second fit-coupling portion from a first fit-coupling portion by using a tool in a separation hole portion during a disassembly process such that the assembly process can be minimized and replacement of parts can be easily carried out, thereby improving workability in maintenance.

In addition, the present invention can be applied to various products because the user can easily maximize the tension of the string and easily apply it to shoes that require high tension.

In addition, the present invention can extend the range of products to be applied by using multiple strings at the same time.

In addition, when string tightening device of the present invention is applied to a product such as footwear by manufacturing a base as a separable type, a coupling extension portion of the base is assembled to the product first, and then a pillar portion is assembled to the base such that the assembly process of the product and the assembly process of the string tightening device can be separated, thereby further improving assembling quality.

MODE FOR INVENTION

Figure 1:
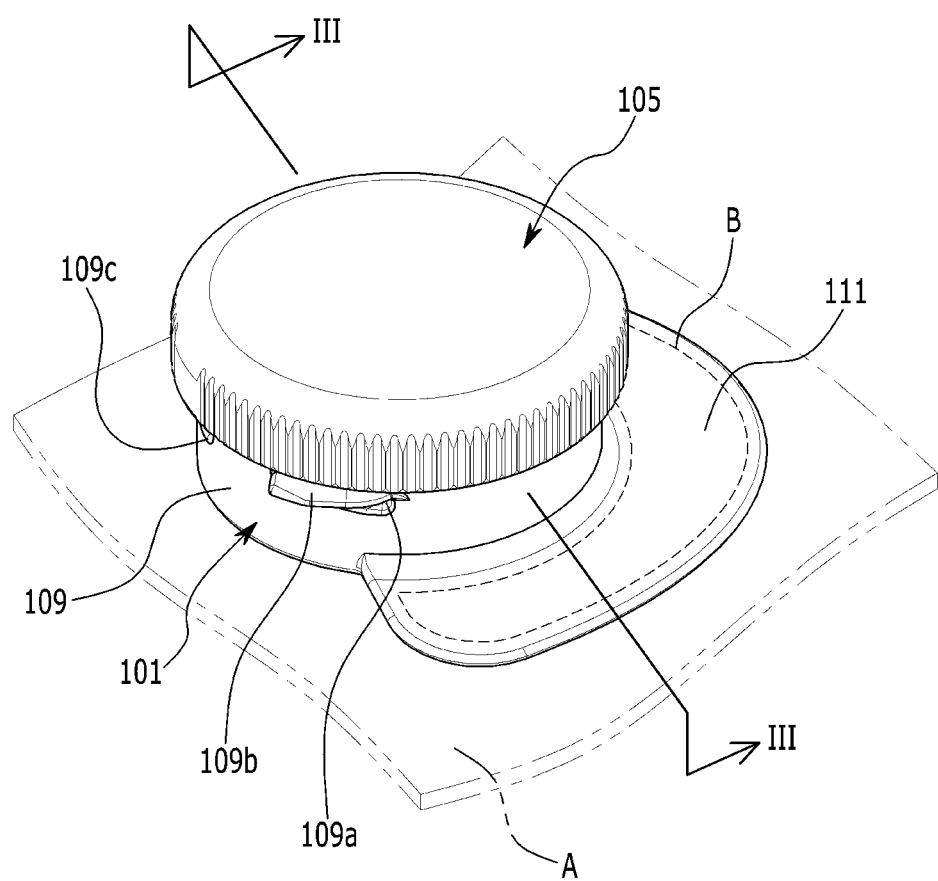
FIG. 1 is a perspective view that illustrates an external appearance of a string tightening device for description of a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways. The drawings and description are to be regarded as illustrative in nature and not restrictive for explicit description of the present invention. Like reference numerals designate like elements throughout the specification.

Figure 2:
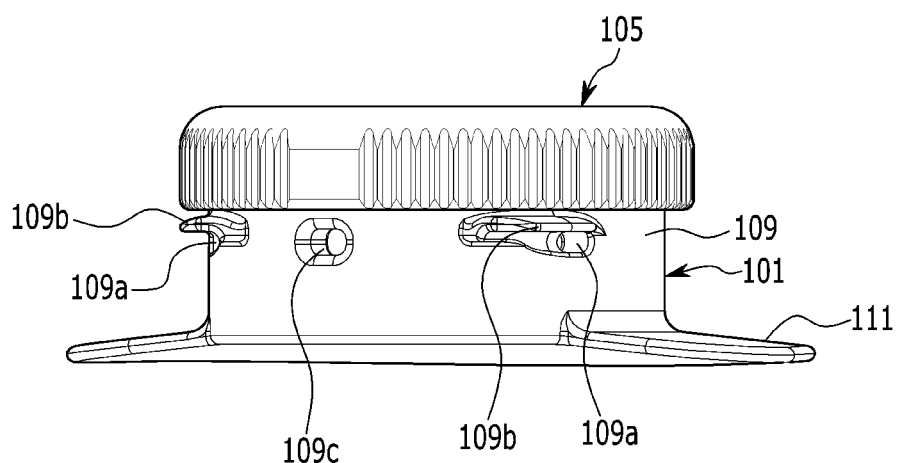
FIG. 2 is a side view of FIG. 1.
Figure 3:
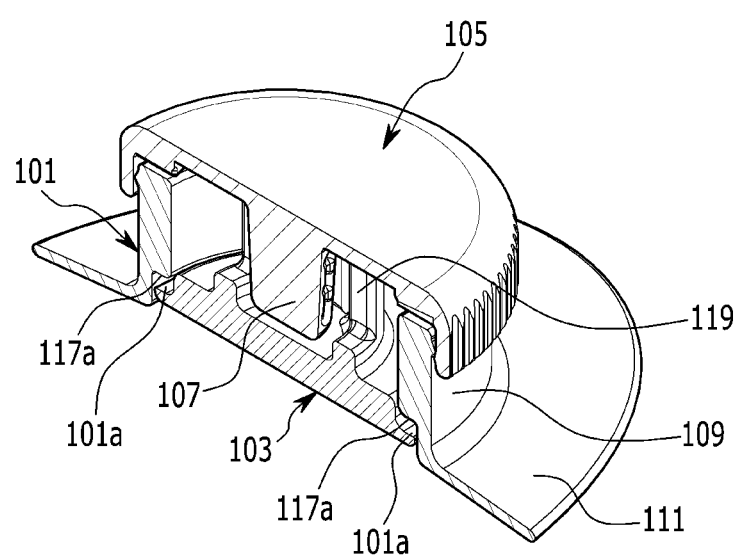
FIG. 3 is a cross-sectional view of FIG. 1, taken along the line III-III, and illustrates a string tightening device.

FIG. 1 is a perspective view for description of a first exemplary embodiment of the present invention, and FIG. 2 is a side view of FIG. 1, and FIG. 3 is a cross-sectional view of FIG. 1, taken along the line III-III, and illustrates a string tightening device.

A string tightening device according to a first exemplary embodiment of the present invention includes a base 101, a lower rotation member 103, and an upper rotation member 105. In addition, the upper rotation member 105 may be provided with an integrally molded string engaging portion 107.

The base 101 includes an outer housing portion 109 and a coupling extension portion 111.

The outer housing portion 109 of the base 101 is provided with a space that is penetrated in a direction that is substantially parallel with a virtual shaft inside the outer housing portion 109, and is preferably formed in the shape of a cylinder. In addition, the outer housing portion 109 is provided with the coupling extension portion 111 that is integrally formed in some or all the outer housing portion 109 in a radial direction at an external circumferential surface thereof. The coupling extension portion 111 may be formed of a synthetic resin material having excellent flexibility or elasticity. The outer housing portion 109 and the coupling extension portion 111 may be formed of the same material, and may be integrally molded. The coupling extension portion 111 is formed in a thin plate shape, so that flexibility can be increased even when the outer housing portion 109 is made of the same material. As shown in FIG. 1, the coupling extension portion 111 may be fixed to a product A such as footwear, bags, or clothing by sewing or bonding or by a screw or a chip (not shown). FIG. 1 shows that the coupling extension portion 111 can be coupled to the product A by sewing. The letter B shown in FIG. 1 denotes a sewing line that can be seen when the coupling extension portion 111 is coupled to the product A by sewing. The coupling extension portion 111 may be coupled to the product A by sewing, but may be coupled to the product A by various coupling methods such as adhesion or screw coupling.

Figure 5:
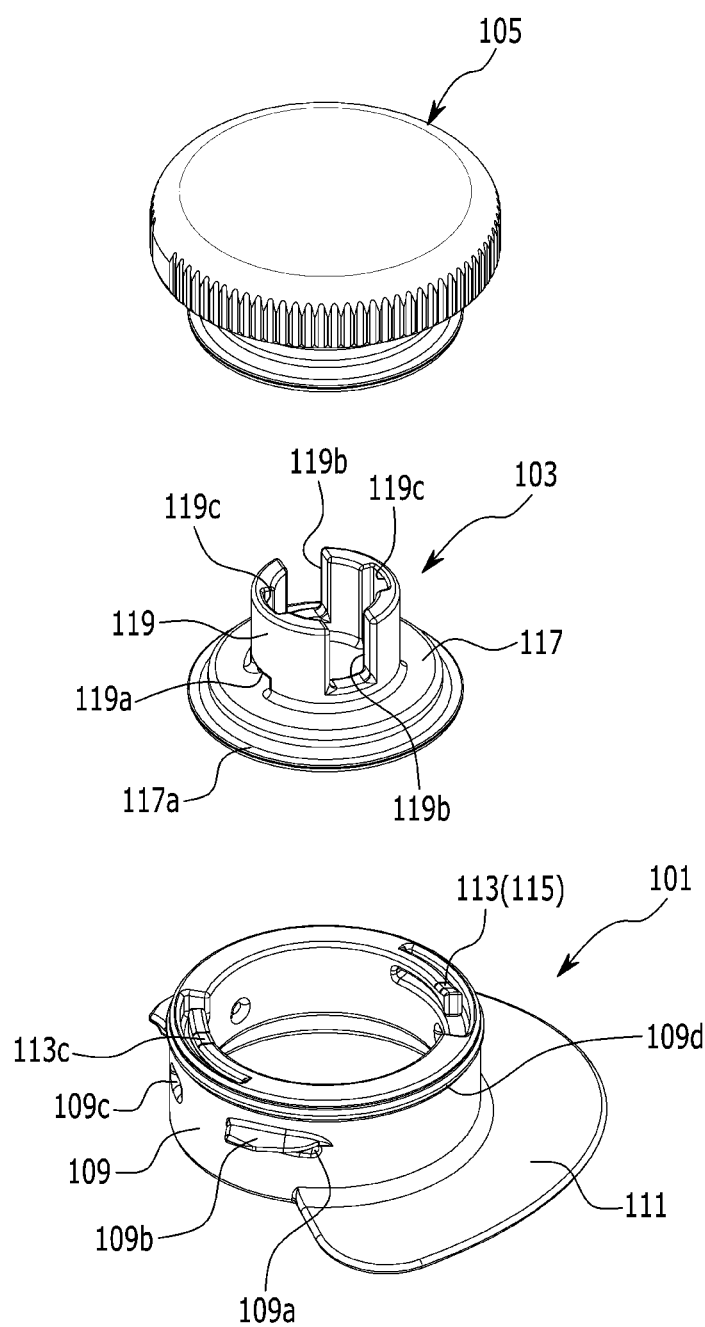
FIG. 5 is an exploded perspective view of main parts of FIG. 1 for description of the first exemplary embodiment of the present invention.

The outer housing portion 109 has a cylindrical shape, and a first locking portion 113 is provided on an upper portion thereof (see FIG. 5). The first locking portion 113 may be integrally molded with the outer housing portion 109 or may be separately molded and then coupled thereto, and may be formed of an elastic latch 115. That is, one side of the elastic latch 115 extends from the upper end of the outer housing portion 109 such that a free end portion 115a may be formed (refer to FIG. 6).

In the exemplary embodiment of the present invention, the outer housing portion 109 is exemplarily formed in the shape of a cylinder, but this is not restrictive, and a cross-section of the outer housing portion 109 cut horizontally may be formed in a cylinder shape such as an ellipse or polygon.

Figure 6:
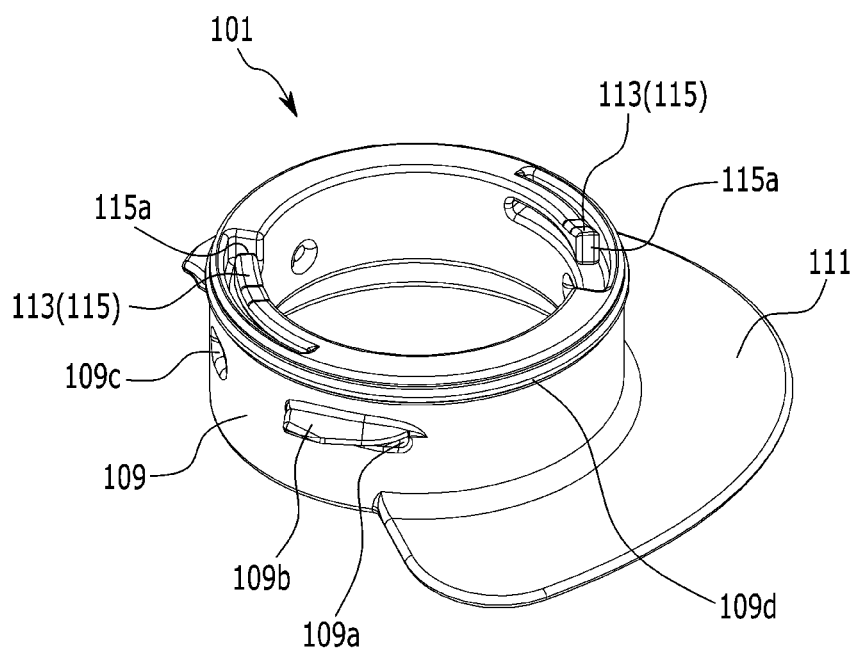
FIG. 6 is a perspective view of the base for description of the first exemplary embodiment of the present invention.

In addition, the free end portion 115a is disposed to enable an elastic force to be applied upward of the upper end portion of the outer housing portion 109 such that the free end portion 115a may protrude in a direction of the upper end portion of the outer housing portion 109 in a free state during which no force is applied thereto (refer to FIG. 6). In addition, a space is provided in a lower end portion of the elastic latch 115 such that the free end portion 115a may move to a upper end or a lower end of the elastic latch 115 (refer to FIG. 6). In the first exemplary embodiment of the present invention, as another example, an elastic force may be applied in an outer or inner side direction of the outer housing portion 109.

Figure 24:
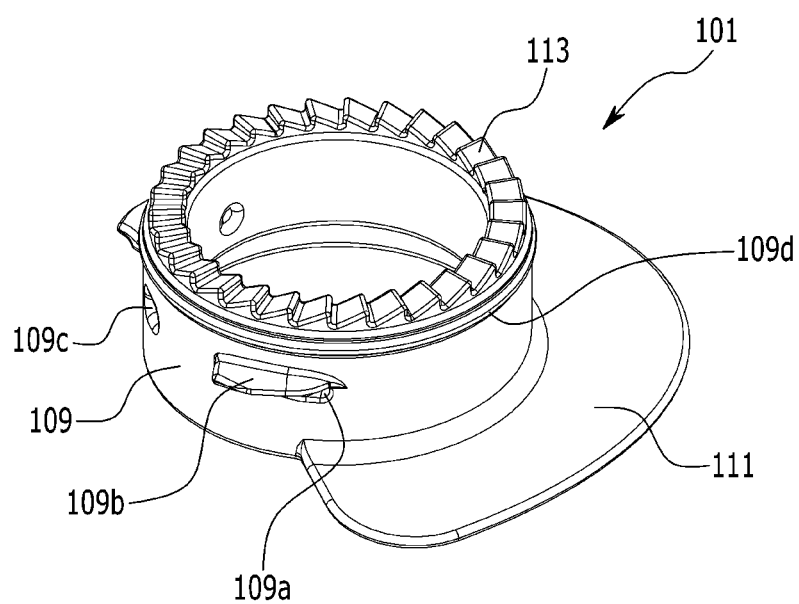
FIG. 24 illustrates a base for description of another example of the exemplary embodiment of the present invention.

In the first exemplary embodiment of the present invention, as another example, the first locking portion 113 may be provided as a projection that is formed in the shape of a gear having a constant slope and continuously arranged, instead of having the elastic latch 115 (refer to FIG. 24). In this case, the elastic latch 115 may be disposed in the upper rotation member 105, while corresponding to the first locking portion 113.

The outer housing portion 109 is provided with first string penetration hole portions 109a that are formed of holes penetrating a wall (refer to FIG. 2 and FIG. 6). The first string penetration hole portion 109a may be a hole or an aperture through which the string can pass.

In addition, the outer housing portion 109 may be provided with a string guide portion 109b that protrudes at the periphery of the first string penetration hole portion 109a. The string guide portion 109b is preferably protruded to an outer side of the first string penetration hole portion 109a from an upper end side thereof. The string guide portion 109b may prevent the upper rotation member 105 from interfering when a user rotates the upper rotation member 105 in a state that the string applied to footwear is passed through the first string penetration hole portion 109a.

Meanwhile, a separation hole portion 109c may be protruded in the outer housing portion 109 while penetrating a wall of the outer housing portion 109. When the string tightening device of the first exemplary embodiment of the present invention is disassembled, a tool having a length of a screwdriver or an awl and having a relatively sharp end may be inserted into the separation hole portion 109c provided in the outer housing portion 109.

Figure 4:
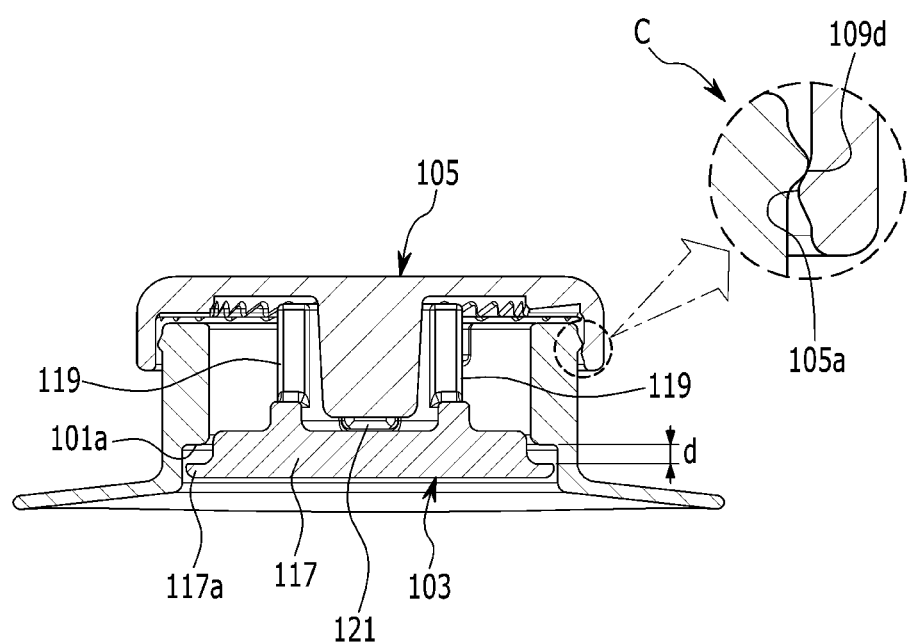
FIG. 4 is a cross-sectional view of a state in which a base, a lower rotation member, and an upper rotation member are coupled to each other, viewed by cutting the state in a vertical direction for description of the first exemplary embodiment of the present invention.

As shown in FIG. 3 and FIG. 4, the base 101 formed in a shape of which an interior circumference penetrates in a direction parallel with the virtual center axis is provided with a first projection portion 101a that is recessed along a circumferential direction at an interior circumference of a lower end thereof. Such a first projection portion 101a is preferably provided in the interior circumference of the lower end of the outer housing portion 109 of the base 101 along the circumferential direction. The first projection portion 101a enables the lower rotation member 103 to move to the lower end in the base 101 and at the same time limit the movement of the lower rotation member 103 over a certain distance section toward an upper end portion.

The lower rotation member 103 can be fitted near the bottom surface of the outer housing portion 109 of the base 101. The lower rotation member 103 may rotate together with the upper rotation member 105. The lower rotation member 103 is disposed at a position that can be separated from the base 101. The lower rotation member 103 includes a plate portion 117 and an inner housing portion 119.

The plate portion 117 of the lower rotation member 103 may have a plate shape. The plate portion 117 of the lower rotation member 103 has a second projection portion 117a along an outer edge. The second projection portion 117a of the plate portion 117 corresponds to the first projection portion 101a of the base 101 described above. The second projection portion 117a of the plate portion 117 may maintain a distanced (refer to FIG. 4) with the first projection portion 101a of the base 101, or may limit the movement in a straight line direction within a constant distance by being caught in the first projection portion 101a. Such a structure allows the lower rotation member 103 to be separated from the base 101, but can be moved only a certain distance d in the direction toward the upper rotation member 105.

The inner housing portion 119 of the lower rotation member 103 is provided as a cylindrical shape with a crack on one side of the plate portion 117. The plate portion 117 and the inner housing portion 119 may be integrally molded.

Figure 7:
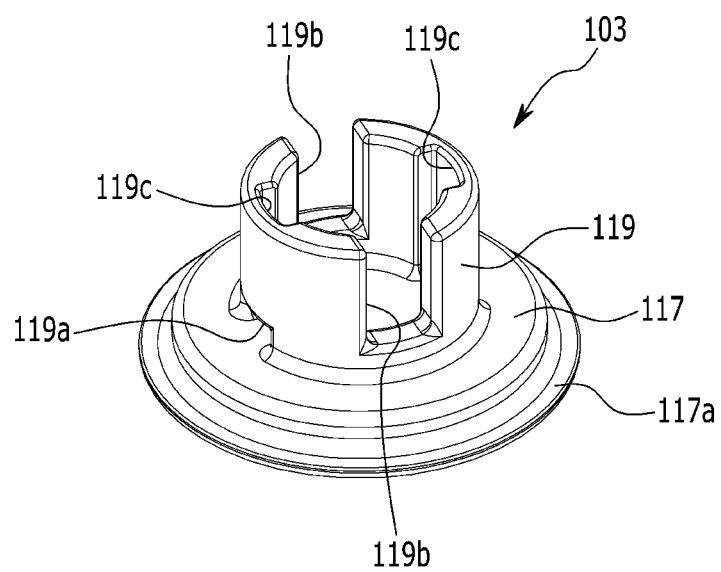
FIG. 7 is a perspective view of the lower rotation member for description of the first exemplary embodiment of the present invention.

The inner housing portion 119 of the lower rotation member 103 is provided with at least one first fitting coupling portion 119a. The first fitting coupling portion 119a may be formed of a hole or an aperture (refer to FIG. 7). Such a first fitting coupling portion 119a is a portion that can fix the upper rotation member 105 by the second fitting coupling portion 121, and may be provided as a pair, which face each other.

In addition, the inner housing portion 119 may be provided with a second string penetration hole portion 119b where a groove is formed in a wall thereof such that a string passes therethrough. The inner housing portion 119 may serve as a bobbin around which the string is wound on its external circumferential surface.

In addition, the inner housing portion 119 may be provided with at least one guide portion 119c formed in a groove shape on the inner wall surface.

Figure 8:
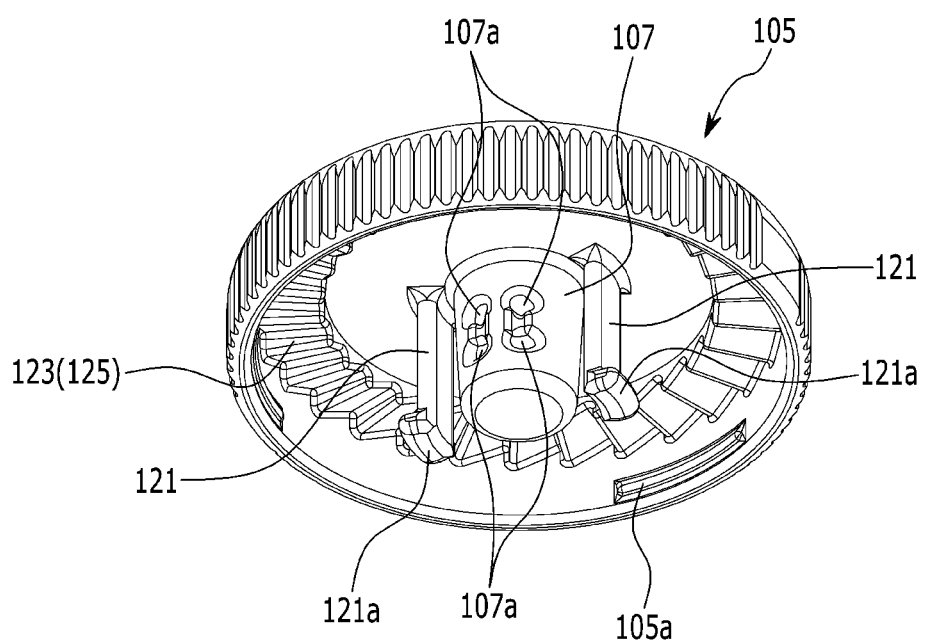
FIG. 8 is a perspective view of the upper rotation member for description of the first exemplary embodiment of the present invention.

The upper rotation member 105 will be described with reference to FIG. 8. The upper rotation member 105 may include a second fitting coupling portion 121. In addition, the second fitting coupling portion 121 may be provided with a protrusion 121a at a front end thereof.

The protrusion 121a of the second fitting coupling portion 121 of the upper rotation member 105 is coupled to the first fitting coupling portion 119a of of the lower rotation member 103. Thus, the upper rotation member 105 and the lower rotation member 103 may rotate together. In the upper rotation member 105, the second fitting coupling portion 121 protrudes toward the lower rotation member 103. A portion of the protrusion 121a of the second fitting coupling portion 121, facing the lower rotation member 103, forms a free end, and a part of the free end protrudes in a direction away from a center of the upper rotation member 105. Such a second fitting coupling portion 121 is preferably formed of an elastic body having an elastic force. The second fitting coupling portion 121 may be guided by the guide portion 119c provided in the lower rotation member 103 such that the protrusion 121a may be fitted and coupled to the first fitting coupling portion 119a of the lower rotation member 103.

The upper rotation member 105 is provided with a second locking portion 123 that is disposed on a plane facing the lower rotation member 103 while having a constant gap along a circumference direction. Such a second locking portion 123 of the upper rotation member 105 corresponds to the first locking portion 113 of the base 101. The second locking portion 123 of the upper rotation member 105 is preferably formed of a projection portion 125 that is formed of grooves and protrusions disposed at a regular interval. That is, the projection portion 125 of the upper rotation member 105 may be formed in the shape of gear teeth inclined in one direction. Thus, the projection portion 125 of the upper rotation member 105 may rotate only in one direction when contacting the elastic latch 115 of the base 101. That is, the elastic latch 115 of the base 101 is supported by the projection portion 125 of the upper rotation member 105 and rotates the upper rotation member 105 only in one direction (refer to FIG. 8).

The first locking portion 113 of the base 101 and the second locking portion 123 of the upper rotation member 105 may be disposed with opposite shapes (Refer to FIG. 24). That is, the first locking portion 113 of the base 101 and the second locking portion 123 of the upper rotation member 105 may be disposed so that they can be engaged with each other. Meanwhile, a rotation unit position adjusting portion C (refer to FIG. 9) includes a first protrusion portion 109d of the outer housing portion 109 of the base 101 and a second protrusion portion 105a of the upper rotation member 105. As another example of the exemplary embodiment of the present invention, one of the first protrusion portion 109d and the second protrusion portion 105a may be formed of a protrusion and the other may be formed of a groove corresponding to the protrusion.

The rotation unit position adjusting portion C serves to maintain a posture in a state where the first locking portion 113 of the base 101 and the second locking portion 123 of the upper rotation member 105 are in contact with each other, or maintain the posture in a distant state. When the posture in the state where the first locking portion 113 of the base 101 and the second locking portion 123 of the upper rotation member 105 are in contact with each other is maintained, the upper rotation member 105 can rotate only in one direction, and the upper rotation member 105 may freely rotate in bi-directions while maintaining the posture in the distant state.

Meanwhile, the first protrusion portion 109d is formed at an external circumferential surface of the outer housing portion 109 of the base 101. The first protrusion portion 109*d* provided in the outer housing portion 109 may have a shape that radially protrudes in a predetermined section or a whole section area along the external circumferential surface of the outer housing portion 109.

In addition, the upper rotation member 105 has a shape that surrounds the upper end and a part of the external circumferential surface of the outer housing portion 109 of the base 101. In the upper rotation member 105, the second protrusion portion 105*a* may protrude along the circumferential direction on a plane where the upper rotation member 105 and the outer housing portion 109 of the base 101 face each other. Such a second protrusion portion 105*a* may be disposed only in a partial section along the circumferential direction.

That is, the first protrusion portion 109*d* and the second protrusion portion 105*a* may change a position of the upper rotation member 105 in a virtual axial direction by riding over the protruding portions (refer to FIG. 4).

In the exemplary embodiment of the present invention, the first protrusion portion 109*d* is formed at an external circumferential surface of the outer housing portion 109 and the second protrusion portion 105*a* corresponding to the first protrusion portion 109*d* is formed at an internal circumferential surface of the upper rotation member 105, but this is not restrictive. The first protrusion portion 109*d* may be formed at an internal circumferential surface of the outer housing portion 109 and the second protrusion portion 109*d* may be formed at the corresponding position in the upper rotation member 105 (not shown).

The upper rotation member 105 may be coupled with the string engaging portion 107. The string engaging portion 107 may be formed in the shape of a taper that extends from the upper rotation member 105 and of which a free end has a diameter that is smaller than that of a fixed end. The string engaging portion 107 has the taper shape so as to assure a sufficient moving space when the second fitting coupling portion 121 of the upper rotating member 105 is separated from the first fitting coupling portion 119*a*. Thus, the string tightening device according to the first exemplary embodiment of the present invention has a structure that can be easily disassembled. That is, the second fitting coupling portion 121 of the upper rotation member 105, fitted in the first fitting coupling portion 119*a*, is separated from the first fitting coupling portion 119*a* when being pressed by a tool such as a screwdriver or an awl through the separation hole portion 109*c*. In this case, since the string engaging portion 107 having the taper shape assures a space for the second fitting coupling portion 121 to move along an axial center direction, it can be easily disassembled.

The string engaging portion 107 is provided with a plurality of third string through-holes 107*a*. The third string through-holes 107*a* may be formed of one or more holes that penetrate the string engaging portion 107. The third string through-hole 107*a* may include four third string through-holes 107*a*, each formed at a right angle or a constant angle with the axial direction of the string engaging portion 107. That is, the third string through-hole 107*a* may be formed in the shape that penetrates the string engaging portion 107 in a radial direction from a center portion and a free end side. In the exemplary embodiment of the present invention, the third string through-hole 107*a* includes four third string through-holes 107*a*, but this is not restrictive, and may include one or more depending on design.

The assembling and disassembling process and operation process of the first exemplary embodiment of the present invention carried out in the above-stated way will be described in detail as follows.

Figure 10:
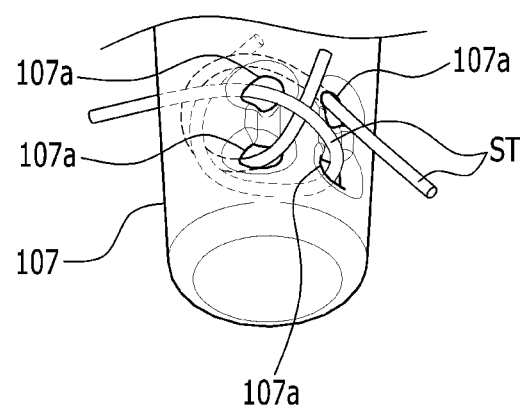
FIG. 10 is provided for exemplary description of a method for fixing a string to the string engaging portion of the first exemplary embodiment of the present invention.
Figure 11:
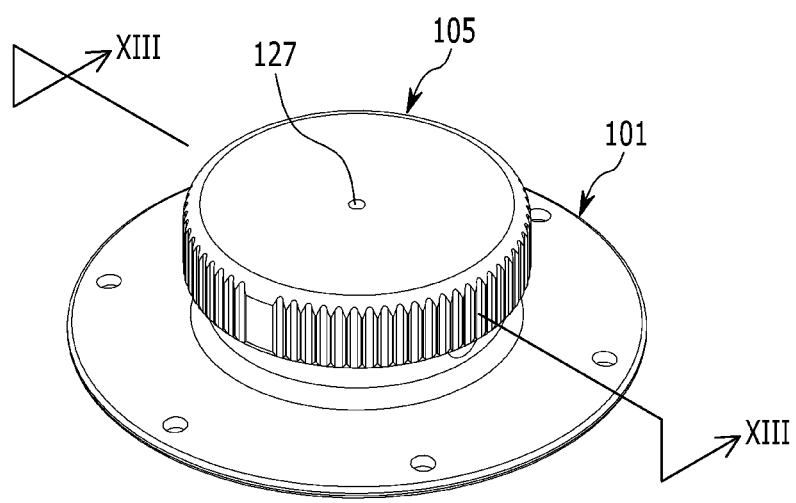
FIG. 11 is a perspective view that illustrates an external appearance of a string tightening device for description of a second exemplary embodiment of the present invention.
Figure 12:
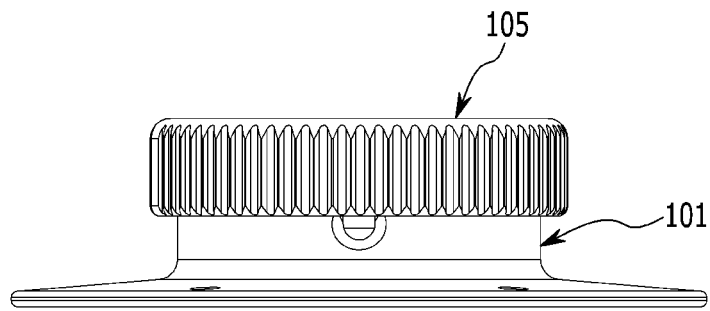
FIG. 12 is a side view of FIG. 11.
Figure 13:
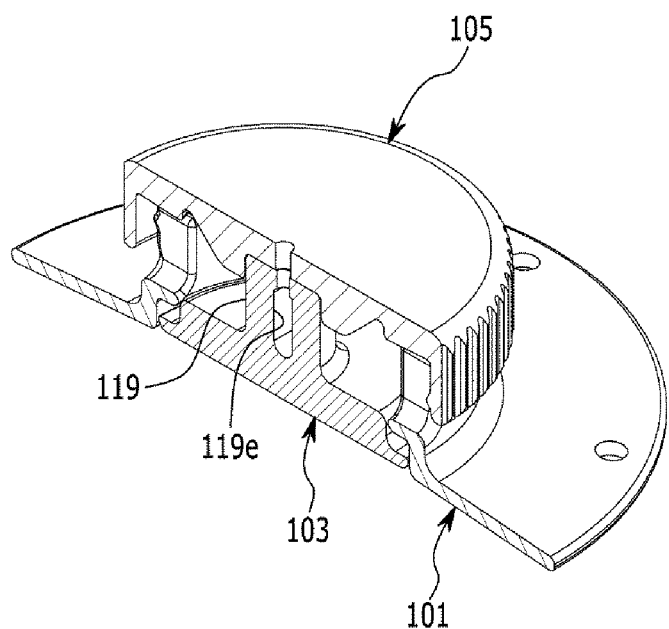
FIG. 13 is a cross-sectional view of FIG. 11, taken along the line XIII-XIII.
Figure 14:
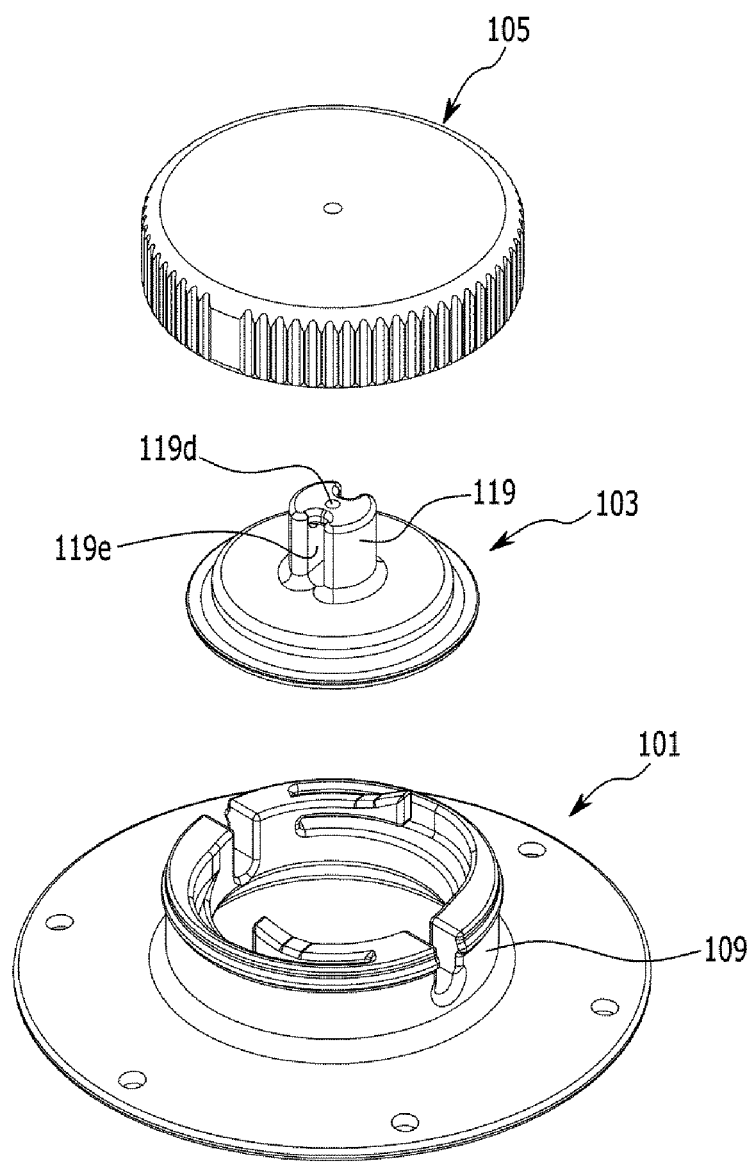
FIG. 14 is an exploded perspective view of main parts of a string tightening device according to the second exemplary embodiment of the present invention.
Figure 15:
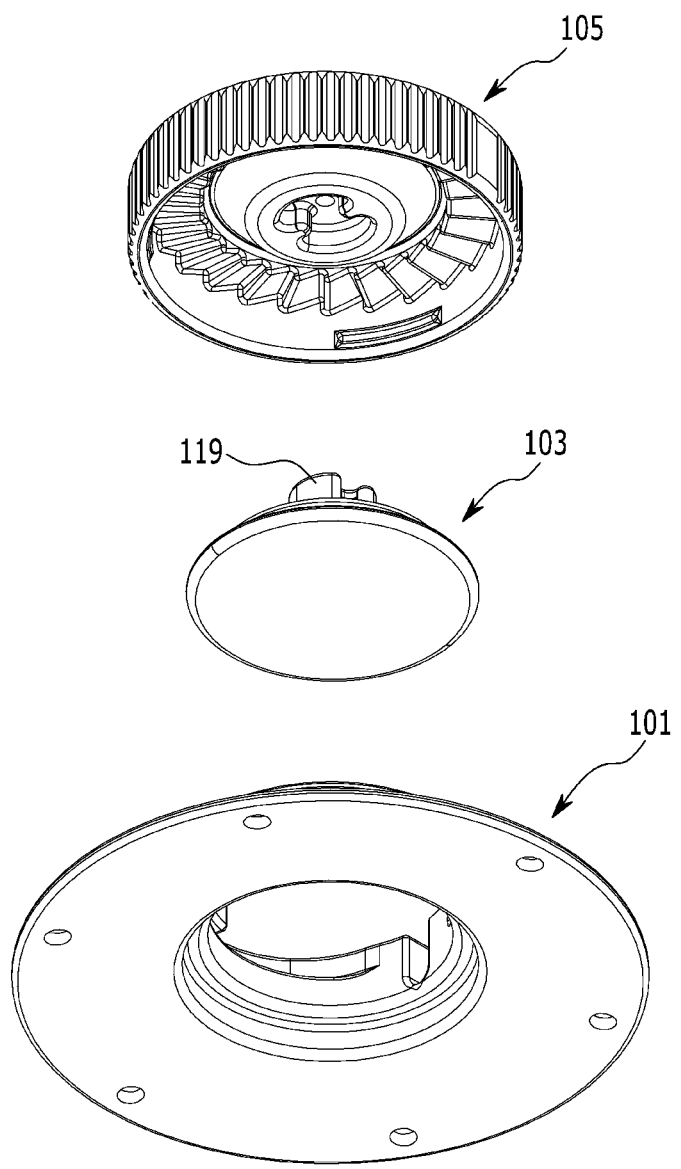
FIG. 15 is a bottom perspective view of FIG. 14.

First, a worker fits the lower rotation member 103 into the base 101. That is, the worker inserts the lower rotation member 103 into the base 101 from a lower portion of the base 101 to an upper side of the base 101. In addition, in such a state, the worker passes a string ST applied to a product A such as footwear through the first string penetration hole portion 109*a* of the base 1 and then passes the string ST through the second string penetration hole portion 119*b* of the lower rotation member 103. Next, as shown in FIG. 10, the worker fits the string ST into the third string penetration hole portions 107*a* provided in the string engaging portion 107.

In this case, the worker repeatedly performs the same action such as inserting the string ST into one hole of the third string penetration hole portion 107*a* and then into another hole on the opposite side. In this method, the string is fixed to the string engaging portion 107 even if there is no separate knot or hook on the tip of the string.

In addition, the worker couples the upper rotation member 105 to the lower rotation member 103. In this case, the second fitting coupling portion 121 of the upper rotation member 105 is guided along the guide portion 119*c* of the lower rotation member 103 such that the protrusion 121*a* of the second fitting coupling portion 121 is fitted into the first fitting coupling portion 119*a* of the lower rotation member 103, which is formed as a hole or an aperture.

In addition, as shown in FIG. 1, the coupling extension portion 111 of the base 101 is coupled to the product A such as footwear, bags, or clothes, by sewing or bonding. Thus, the string tightening device of the present invention can be fixed to the product A such as footwear, bags, or clothes.

A user may need to disassemble the string tightening device of the present invention, and a process for disassembling the string tightening device will now be described.

The user inserts a thin and long member (not shown) into the separation hole portion 109*c* of the base 101. Then the long member may push the protrusion 121*a* of the second fitting coupling portion 121 by pressing the same. The protrusion 121*a* of the second fitting coupling portion 121 is then separated from the first fitting coupling portion 119*a* of the inner housing portion 119 of the lower rotation member 10. Accordingly, the lower rotation member 103 and the upper rotation member 105 can be easily separated.

As described, according to the present invention, maintenance of the string, such as replacement of a string, can be facilitated by separating the lower rotation member 103 and the upper rotation member 105 by a simple operation.

FIG. 4 shows a state in which that the upper rotation member 105 moves toward the base 101 such that the first locking portion 113 of the base 101 and the second locking portion 123 of the upper rotation member 105 are closely attached. In this case, the user may wind the sting around the inner housing portion 119 by turning the upper rotation member 105 in one direction. That is, when the upper rotation member 105 rotates in one direction, the second locking portion 123 rotates over the first locking portion 113 such that the string ST may be wound around the inner housing portion 119. In addition, when the upper rotation member 105 stops rotation, the second locking portion 123 remains engaged with the first locking portion 113. Therefore, the string wound on the inner housing portion 119 maintains the wound state without being unwound.

Figure 9:
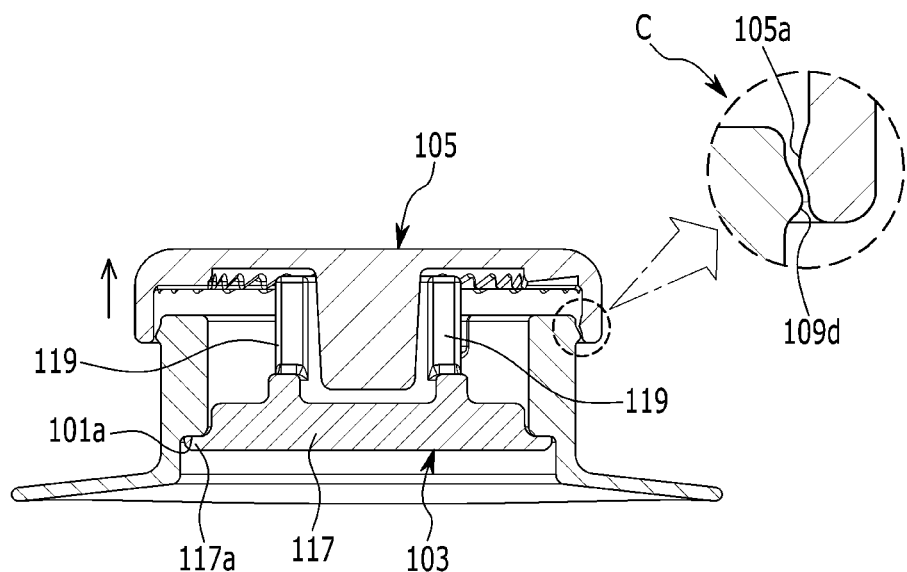
FIG. 9 is a cross-sectional view of a state in which the lower rotation member and the upper rotation member in free rotation for description of the first exemplary embodiment of the present invention.

A process for the user to unwind the string wound round the inner housing portion 119 will now be described (refer to FIG. 9).

The user pulls the upper rotation member 105 in the opposite direction of the base 101 (upward direction in the drawing). Then, the upper rotation member 105 moves in the direction away from the base 101 as the second protrusion portion 105a of the upper rotation member 105 moves over the first protrusion portion 109d of the base 101. In this case, the lower rotation member 103 moves together with the upper rotation member 105 because it is integrally coupled to the upper rotation member 105. The lower rotation member 103 may move a certain distanced while the second projection portion 117a of the lower rotation member 103 is caught by the first projection portion 101a of the base 101 (refer to FIG. 4).

In addition, the second locking portion 123 of the upper rotation member 105 and the first locking portion 113 of the base 101 are separated from each other. That is, the second protrusion 105a of the upper rotation member 105 moves over the first protrusion portion 109d of the base 101 and thus moves in the direction away from the base 101 (upper direction in FIG. 9).

Then, the upper rotating member 105 is in a state of being capable of rotating in bi-directions. Accordingly, the user can unwind the string wound around the inner housing portion 119 by turning the upper rotation member 105.

In addition, when the user moves the upper rotation member 105 toward the base 101 again, the second locking portion 123 of the upper rotation member 105 and the first locking portion 113 of the base 101 are closely attached to each other such that the string wound around the inner housing portion 119 is maintained in a state in which it is not released.

FIG. 11 to FIG. 15 illustrate a string tightening device according to a second exemplary embodiment of the present invention.

Only differences from the first exemplary embodiment will be described in the second exemplary embodiment of the present invention, and description of parts having the same function as in the first exemplary embodiment described above will be omitted.

In the second exemplary embodiment of the present invention, a string is coupled to an inner housing portion 119 while being wound around an external circumferential surface thereof. That is, in the second exemplary embodiment, not as in the first exemplary embodiment, a structure of a string engaging portion 107 may be omitted. An engaging hole 119d may be provided at an upper end of the inner housing portion 119, which facing an upper rotation member 105. Thus, a user may fix the inner housing portion 119 and the upper rotation member 105 by using an engaging member 127 (refer to FIG. 11) such as a screw and the like. In addition, when the string tightening device of the present invention needs to be disassembled for replacements of parts, the string tightening device can be easily disassembled by simply separating the engaging member 127 such as a screw.

Meanwhile, the inner housing portion 119 may be provided with a long hole 119e penetrated in a middle thereof. Thus, the user can more easily insert a string through the long hole 119c of the inner housing portion 119 to wind the string around the external circumference of the inner housing portion 119.

Figure 16:
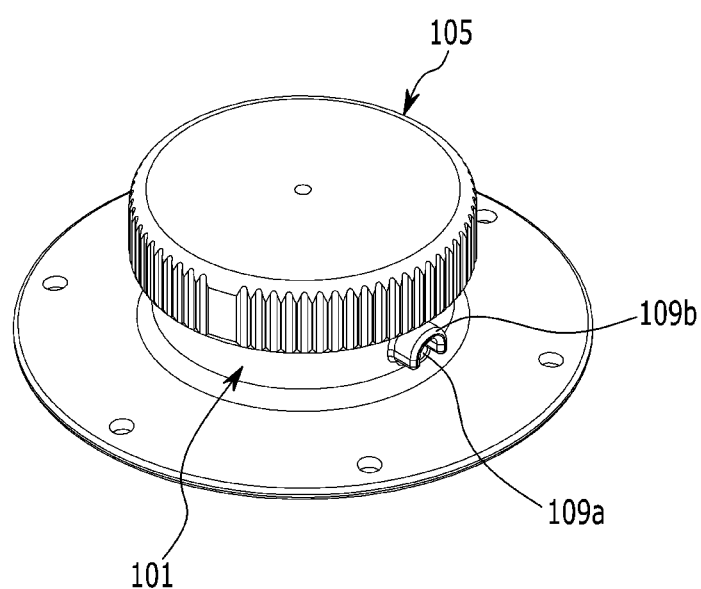
FIG. 16 is a perspective view of a string tightening device according to a third exemplary embodiment of the present invention.
Figure 17:
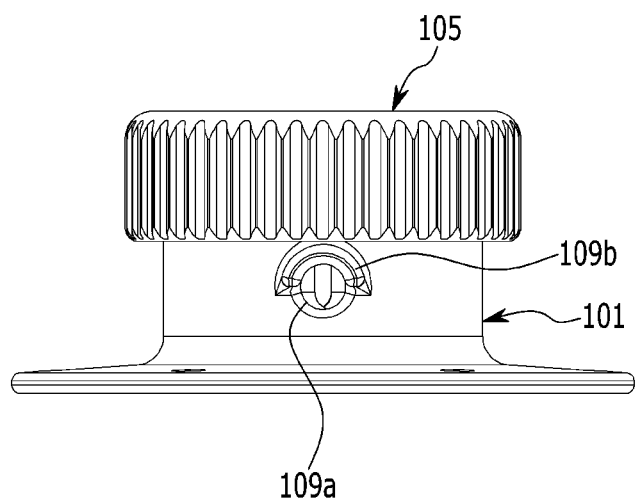
FIG. 17 is a side view of the string tightening device shown in FIG. 16.

FIG. 16 and FIG. 17 illustrate a string tightening device according to a third exemplary embodiment of the present invention. Only differences from the above-described exemplary embodiments will be described in the third exemplary embodiment of the present invention. In addition, the third exemplary embodiment of the present invention may be additionally applied to the example described in the exemplary embodiments of the present invention.

In the string tightening device according to the third exemplary embodiment of the present invention, first string penetration hole portions 109a are provided at opposite sides, and a semi-circular-shaped string guide portion 109b is provided at an upper portion of the first string penetration hole portion 109a. The string guide portion 109b of the third exemplary embodiment of the present invention may serve to prevent the string from interfering with the upper rotation member 105 when the user rotates the upper rotation member 105.

Figure 18:
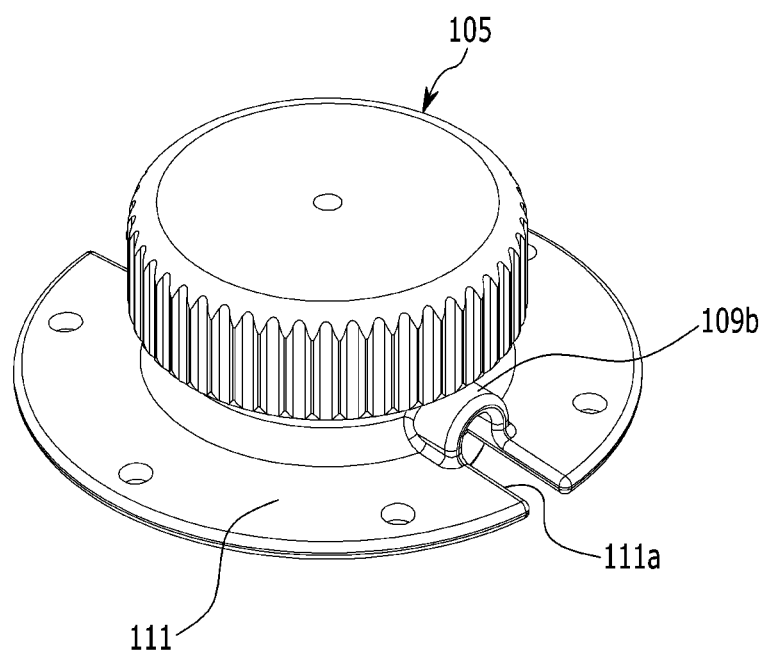
FIG. 18 is a perspective view of a string tightening device according to a fourth exemplary embodiment of the present invention.
Figure 19:
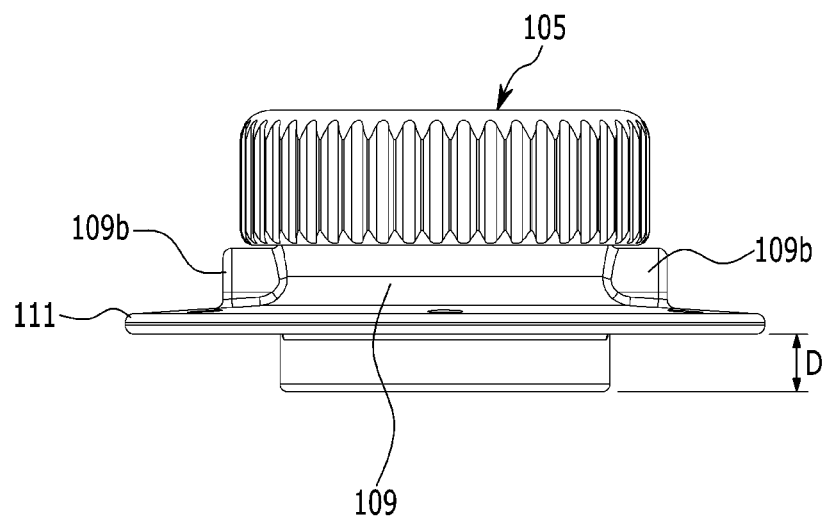
FIG. 19 is a side view of the string tightening device shown in FIG. 18.

FIG. 18 and FIG. 19 illustrate a string tightening device according to a fourth exemplary embodiment of the present invention. Only differences from the above-described exemplary embodiments will be described in the fourth exemplary embodiment of the present invention. In addition, the fourth exemplary embodiment of the present invention may be additionally applied to the example described in the exemplary embodiments of the present invention.

In a string tightening device according to a fourth exemplary embodiment of the present invention, a coupling extension portion 111 provided in a base 101 extends from about a center portion of an outer housing portion 109. That is, the coupling extension portion 111 may extend in a radial direction from a portion separated by a constant distance D from the bottom of the outer housing portion 109. When the string tightening device according to the fourth exemplary embodiment of the present invention is coupled to a product, the coupling extension portion 111 is received in the product and thus coupled thereto, and portions only above the coupling extension portion 111 may protrude to the outside of the product. Thus, when the string tightening device is coupled to the product, a portion protruded to the outside is minimized, thereby increasing the marketability of the product.

In addition, the coupling extension portion 111 may be provided with a fourth string penetration hole portion 111a formed in the shape of a divided groove in a portion thereof. The string is inserted into the fourth string penetration hole portion 111a when the string tightening device is installed in a product, thereby minimizing exposure to the outside. Accordingly, the string tightening device according to the fourth exemplary embodiment of the present invention can further improve the marketability of the product.

Figure 20:
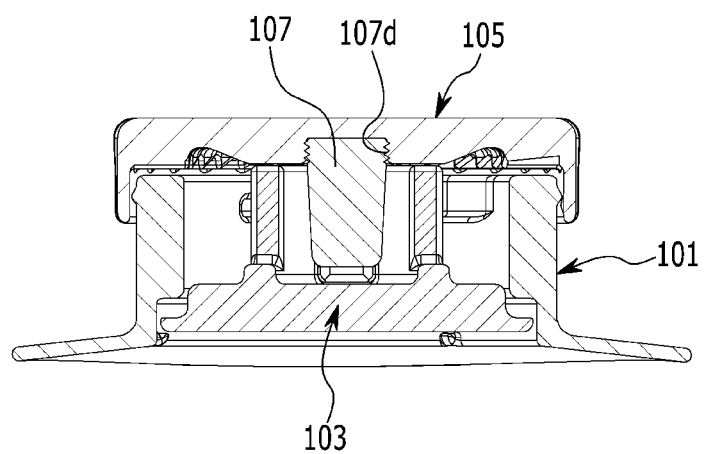
FIG. 20 is a cross-sectional view of a string tightening device viewed by cutting in a vertical direction for description of a fifth exemplary embodiment of the present invention.

FIG. 20 illustrates a string tightening device according to a fifth exemplary embodiment of the present invention. Only differences from the above-described exemplary embodiments will be described in the fifth exemplary embodiment of the present invention.

In a string tightening device according to a fifth exemplary embodiment of the present invention, a string engaging portion 107 and an upper rotation member 105 are fixed in a manner of screw-coupling by a screw coupling portion 107d. Although it is not illustrated, the string engaging portion 107 may be screw-coupled to a lower rotation member 103. In addition, as another example of the fifth exemplary embodiment of the present invention, the string engaging portion 107 may be coupled to an upper rotation member 105 or a lower rotation member 103 by an adhesive. Such a fifth exemplary embodiment of the present invention shows that the present invention can be variously implemented.

Figure 21:
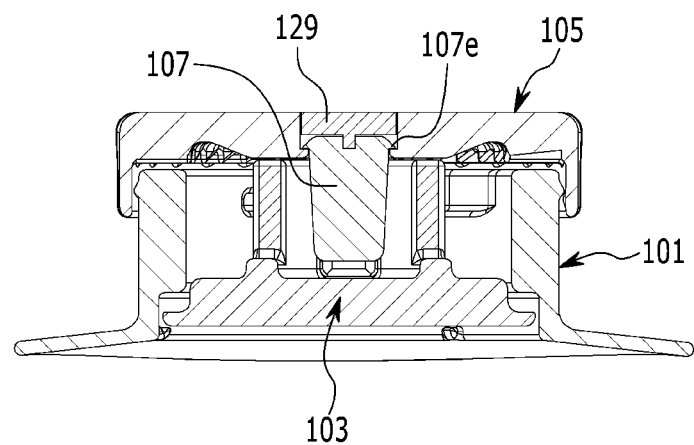
FIG. 21 is a cross-sectional view of a string tightening device viewed by cutting in a vertical direction for description of a sixth exemplary embodiment of the present invention.

FIG. 21 illustrates a string tightening device according to a sixth exemplary embodiment of the present invention. Only differences from the above-described exemplary embodiments will be described in the sixth exemplary embodiment of the present invention.

In a string tightening device according to a sixth exemplary embodiment of the present invention, a projection 107e is provided at one end of a string engaging portion 107, and another projection (not shown) is provided in an upper rotation member 105 corresponding to the projection 107e such that the upper rotation member 105 and the string engaging portion 107 can be coupled to each other. In this case, a separate fitting member 129 is fitted into the upper rotation member 105 to prevent the string engaging portion 107 from being seen from the outside while preventing separation of an upper portion of a bobbin. The sixth exemplary embodiment of the present invention can vary a method for coupling the string engaging portion 107 and the upper rotation member 105.

Figure 22:
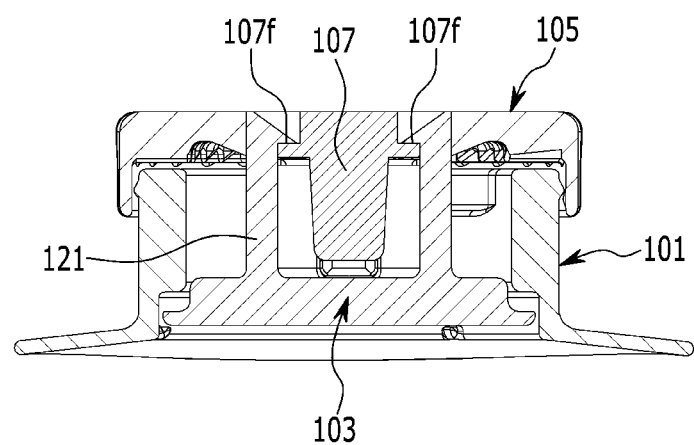
FIG. 22 is a cross-sectional view of a string tightening device viewed by cutting in a vertical direction for description of a seventh exemplary embodiment of the present invention.

FIG. 22 illustrates a string tightening device according to a seventh exemplary embodiment of the present invention. Only differences from the above-described exemplary embodiments will be described in the seventh exemplary embodiment of the present invention.

In a string tightening device according to a seventh exemplary embodiment of the present invention, a string engaging portion 107 and an upper rotation member 105 may be integrally formed or separately formed and then coupled, and a second fitting coupling portion 121 is integrally formed with a lower rotation member 103. In addition, the upper rotation member 105 or the string engaging portion 107 may be provided with another fitting coupling portion 107f to which the second fitting coupling portion 121 is fitted. Thus, the second fitting coupling portion 121 integrally formed with the lower rotation member 103 may be coupled to the upper rotation member 105 or the string engaging portion 107 through the same method described in the above exemplary embodiment. The seventh exemplary embodiment of the present invention also shows that the present invention can be variously implemented.

Figure 23:
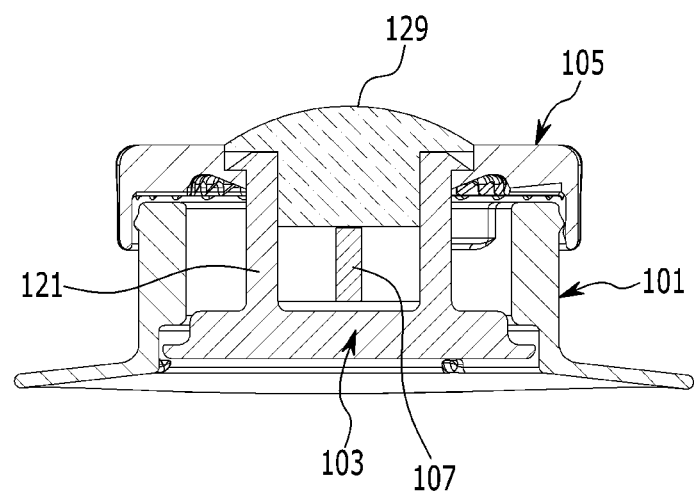
FIG. 23 is a cross-sectional view of a string tightening device viewed by cutting in a vertical direction for description of an eighth exemplary embodiment of the present invention.

FIG. 23 illustrates a string tightening device according to an eighth exemplary embodiment of the present invention. Only differences from the above-described exemplary embodiments will be described in the eighth exemplary embodiment of the present invention.

The eighth exemplary embodiment of the present invention has a similar structure to the seventh exemplary embodiment, and a fitting member 129 may be fitted into a center portion of an upper rotation member 105 to prevent the inside of the string tightening device from being viewed from the outside, while preventing the fitting member 129 from being separated upward. In addition, a string engaging portion 107 formed in another shape may be provided to the fitting member 129 in a direction that is parallel with an axis. The string engaging portion 107 of the eighth exemplary embodiment of the present invention may be a string engaging pillar, and it can be used by simply tying the string without having a hole for inserting a string so that the string can be fixed more easily. Compared to the string engaging portion according to the first exemplary embodiment shown in FIG. 10, the string engaging portion 107 of the eighth exemplary embodiment has an advantage that workability can be improved by more easily combining the strings. The string engaging portion 107 of the eighth exemplary embodiment of the present invention may have a hole to fit and combine the string as necessary.

The eighth exemplary embodiment of the present invention also shows that the composition of the present invention can be varied.

Figure 25:
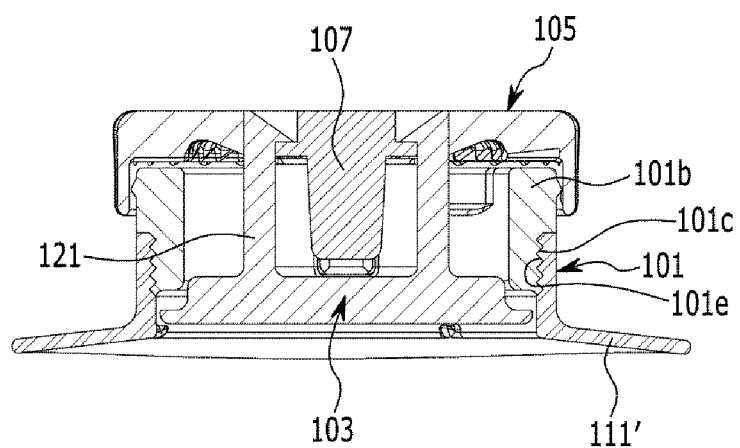
FIG. 25 is a cross-sectional view of a string tightening device viewed by cutting in a vertical direction for description of a ninth exemplary embodiment of the present invention.

FIG. 25 illustrates a string tightening device according to a ninth exemplary embodiment of the present invention. Only differences from the base 101 of the first exemplary embodiment will be described in the ninth exemplary embodiment of the present invention, and description of parts having the same functions as in the first exemplary embodiment described above or the above-described exemplary embodiments will be omitted.

In the ninth exemplary embodiment of the present invention, a base 101 may be divided into a pillar portion 101b and a coupling extension portion 111'. That is, the pillar portion 101b has a first engaging portion 101c such as a screw or tight-fitting portion on an external circumferential surface of a lower portion thereof. In addition, the coupling extension portion 111' includes a second engaging portion 101e corresponding to the first engaging portion 101c. It will be exemplarily described in the ninth exemplary embodiment of the present invention that the engaging portions 101c are screw-coupled. That is, the pillar portion 101b and the coupling extension portion 111' may be integrally formed through screw-coupling.

Such a structure enables the coupling extension portion 111' to be assembled to a product such as footwear first when coupling the string tightening device of the ninth exemplary embodiment of the present invention to the product, and then the string tightening device is assembled separately. In addition, the pillar portion 101b and the coupling extension portion 111' are coupled to each other. Then, a process for manufacturing a product such as footwear and a process for assembling the string tightening device can be separately carried out, thereby improving assembly quality in the process for assembling the device to the product such as footwear.

As another example of the ninth exemplary embodiment of the present invention, a hook coupling structure, a tight fit-coupling structure, a bond coupling structure, or a screw engaging structure may be applied as the engaging portion 101c.

Figure 26:
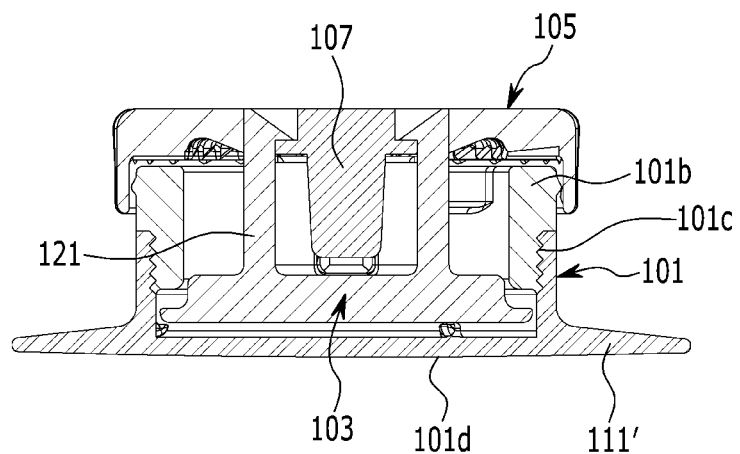
FIG. 26 is a cross-sectional view of a string tightening device viewed by cutting in a vertical direction for description of a tenth exemplary embodiment of the present invention.

FIG. 26 illustrates a string tightening device according to a tenth exemplary embodiment of the present invention. Only differences from the base 101 of the ninth exemplary embodiment will be described in the tenth exemplary embodiment of the present invention, and description of parts having the same functions as in the ninth exemplary embodiment described above or the above-described exemplary embodiments will be omitted.

Compared to the ninth exemplary embodiment, a base 101 of the tenth exemplary embodiment of the present invention may include a closed portion 101d of which the entire bottom surface that forms a coupling extension portion 111' or a portion facing a lower rotation member 103 is closed. That is, the base 101 of the ninth exemplary embodiment has a structure in which a center portion of the coupling extension portion 111' is penetrated in a direction facing toward the lower rotation member 103, but the base 101 of the tenth exemplary embodiment has a structure that is closed by the closed portion 101d.

The tenth exemplary embodiment of the present invention may be effective when the string tightening device is applied to footwear or other products that require the closed portion 101, and may be applied to various products.

In the exemplary embodiment of the present invention, each exemplary embodiment can be implemented by combining necessary parts with each other.

Figure 27:
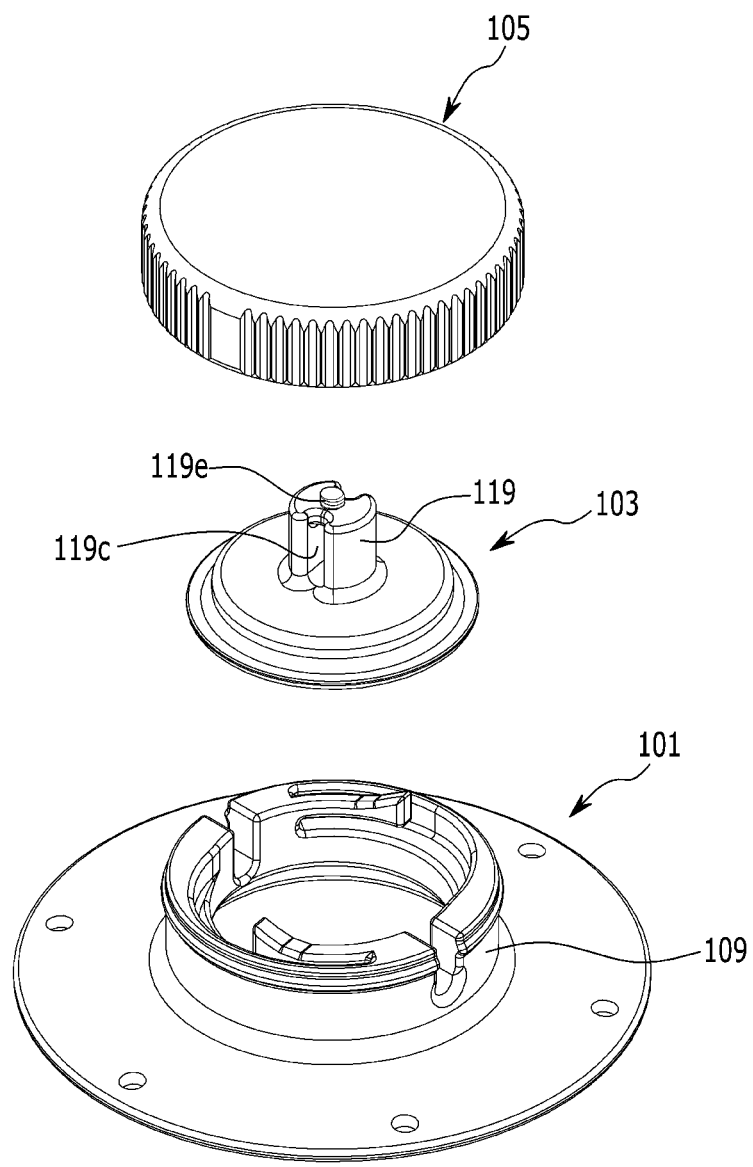
FIG. 27 is a cross-sectional view of a string tightening device for description of an eleventh exemplary embodiment of the present invention.
Figure 28:
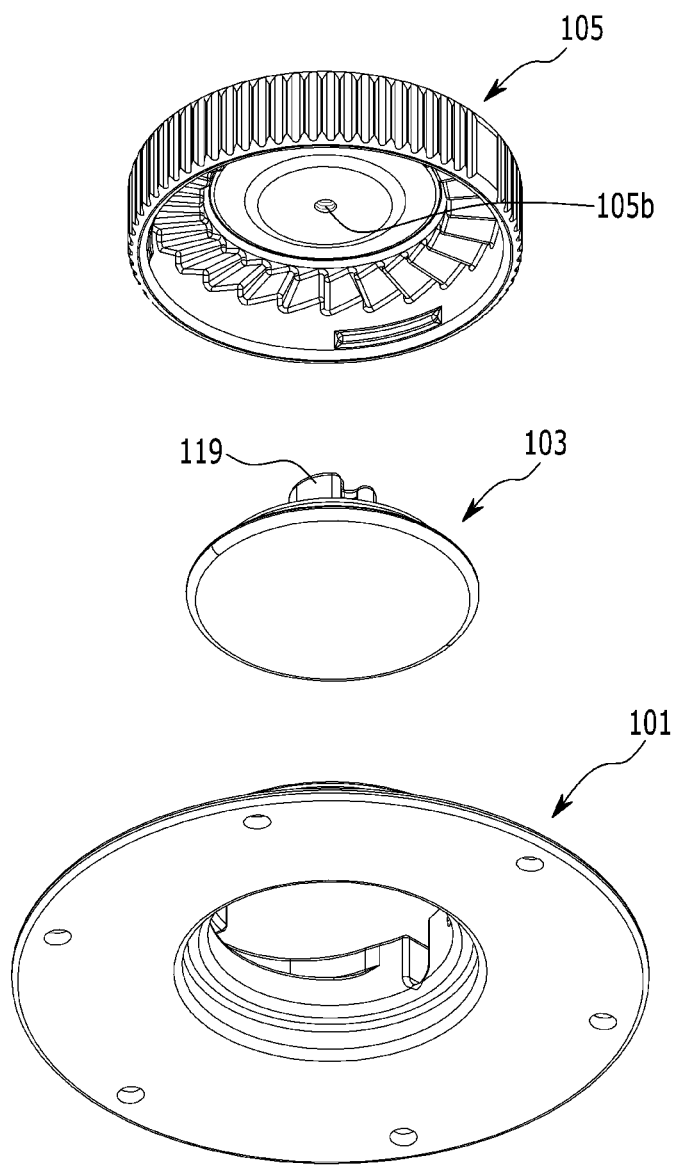
FIG. 28 is a cross-sectional view of a string tightening device viewed from the bottom direction for description of the eleventh exemplary embodiment of the present invention.

FIG. 27 and FIG. 28 illustrate a string tightening device according to an eleventh exemplary embodiment of the present invention. Only differences from the string tightening device of the second exemplary embodiment will be described in the eleventh exemplary embodiment of the present invention, and description of parts having the same functions as in the second exemplary embodiment described above or the above-described exemplary embodiments will be omitted.

It has been described in the second exemplary embodiment that the upper rotation member 105 and the inner housing portion 119 of the lower rotation member 103 are fixed to each other by screw-coupling.

In the eleventh exemplary embodiment of the present invention, a thread portion 109e is integrally formed with an upper portion of an inner housing portion 119 of a lower rotation member 103. In addition, a screw groove portion 105b that is screw-coupled corresponding to the thread portion 109e is formed in the upper rotation member 105. Thus, the upper rotation member 105 may be fixed to the inner housing portion 119 of the lower rotation member 103 through screw-coupling. The eleventh exemplary embodiment of the present invention shows that the exemplary embodiment of the present invention can be configured in various ways.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A string tightening device comprising:
a base where a first locking portion is provided;
a lower rotation member that is disposed in the base and moves a predetermined distance in a direction of separation from the base or the opposite direction thereof; and
an upper rotation member coupled to the lower rotation member, including a second locking portion corresponding to the first locking portion, and rotating only in one direction when the first locking portion and the second locking portion are closely attached,
wherein the lower rotation member or the upper rotation member is provided with an inner housing portion where a string is wound,
wherein the base and the upper rotation member comprise a rotation unit position adjusting portion provided in a portion where the base and the upper rotation member face each other and configured to maintain the first locking portion and the second locking portion in a closely attached state or in a separated state,
wherein the rotation unit position adjusting portion is formed of a first protrusion portion provided in the base and a second protrusion portion provided in the upper rotation member to be adjacent to the first protrusion portion,
wherein the base comprises an outer housing portion formed in the shape of a cylinder and the outer housing portion is provided with a first projection portion that is concave along an internal circumferential direction of a lower end portion thereof,
wherein the lower rotation member comprises a second projection portion which is caught by the first projection portion and thus of which movement is limited to a predetermined distance or less in a direction parallel to a rotation axis of the lower rotation member,
wherein the first projection portion has a first surface facing a second surface of the second projection portion, and
wherein the upper rotation member is configured to move away from the base in the direction parallel to the rotation axis and the second protrusion portion is configured to go over the first protrusion portion, thereafter the first surface of the first projection portion and the second surface of the second projection portion contact to each other and unwinding state is maintained.

2. The string tightening device of claim 1, wherein the first protrusion portion is formed in an outer direction along an external circumferential surface of the base, and
the second protrusion portion is formed along an internal circumferential surface of the upper rotation member, facing the external circumferential surface of the base when the upper rotation member is disposed while surrounding a part of the external circumferential surface of the base.

3. The string tightening device of claim 1, wherein the first locking portion is formed of an elastic latch or a plurality of protection portions, and
the second locking portion is formed of another projection portion or elastic latch caught by the elastic latch or the plurality of projection portions of the first locking portion.

4. The string tightening device of claim 3, wherein the first locking portion is formed of the elastic latch which is formed of an elastic body and of which one end is a free end, and
the second locking portion is formed of the projection portion which is formed in the shape of gear teeth arranged at a regular interval along the circumferential direction.

5. The string tightening device of claim 4, wherein the elastic latch extends from one end of the base and an elastic force is applied in a direction facing one side of the upper rotation member, and
the projection portion is formed in a side of the upper rotation member, facing the elastic member, and forms an inclined surface such that the upper rotation member rotates only in one direction when the free end portion of the elastic latch is closely attached.

6. The string tightening device of claim 1, wherein the base comprises:
a coupling extension portion extending in a radial direction from the outer housing portion.

7. The string tightening device of claim 6, wherein the coupling extension portion is formed of a synthetic resin and is coupled to footwear by sewing or an adhesive.

8. The string tightening device of claim 1, wherein the outer housing portion comprises a first string penetration hole portions through which the string passes while penetrating a wall surface.

9. The string tightening device of claim 8, wherein the outer housing portion comprises a string guide portion provided at the periphery of the first string penetration hole portion and prevents the string from interfering with the upper rotation member.

10. The string tightening device of claim 1, wherein the lower rotation member comprises:
a plate portion; and
an inner housing portion provided in the shape of a cylinder in the plate portion.

11. The sting tightening device of claim 10, wherein the inner housing portion comprises a second string penetration hole portion in which a groove is provided at a wall surface thereof such that the string passes therethrough.

12. The string tightening device of claim 1, wherein the lower rotation member comprises a plurality of first fitting coupling portions, and
the upper rotation member comprises second fitting coupling portions coupled to the first fitting coupling portions.

13. The string tightening device of claim 1, wherein the upper rotation member is integrally formed with a string engaging portion to which the string is fixed.

14. The string tightening device of claim 13, wherein, when a portion of the string engaging portion, coupled to the upper rotation member, is a fixed end and an opposite side thereof is a free end, the string engaging portion is formed in a shape of a taper of which a diameter of the free end is decreased, and comprises at least one third string penetration hole portion through which the string passes.

15. The string tightening device of claim 1, wherein the lower rotation member is integrally formed with the inner housing portion.

16. The string tightening device of claim 1, wherein
the inner housing portion comprises a roof blocking an upper side and a side wall having a slot hole through which the string is inserted or tied up,
the string is wound around the inner housing portion, and
the inner housing portion and the upper rotation member are coupled by an engaging member.

17. The string tightening device of claim 6, wherein the coupling extension portion comprises a fourth string penetration hole portion formed in the shape of a divided groove in a portion thereof.

18. The string tightening device of claim 6, wherein the coupling extension portion extends from a middle portion of an external circumferential surface of the outer housing portion while maintaining a constant distance from the bottom surface with reference to the entire height of the outer housing portion.

19. The string tightening device of claim 1, wherein the base is formed of a pillar portion and a coupling extension portion, and
the pillar portion and the coupling extension portion are coupled by an engaging portion.

20. The string tightening device of claim 1, further comprising a string engaging portion provided with at least one third string penetration hole portion through which the string is inserted,
wherein the upper rotation member is fixed to the string engaging portion through screw-coupling.

21. The string tightening device of claim 1, further comprising a string engaging portion provided with at least one third string penetration hole portion through which the string is inserted,
wherein the upper rotation member is fit-coupled with the string engaging portion, and a fitting member that closes the string engaging portion is coupled to an upper portion of the upper rotation member.

22. The string tightening device of claim 1, wherein the lower rotation member is integrally formed with a second fitting coupling portion, and the second fitting coupling portion is fit-coupled to an upper rotation member.

23. The string tightening device of claim 19, wherein the base comprises a bottom surface that forms a coupling extension portion or a closed portion facing the lower rotation member.

* * * * *